US012615353B2

(12) United States Patent
Ding et al.

(10) Patent No.:     US 12,615,353 B2
(45) Date of Patent:      Apr. 28, 2026

(54) VIEW SYNTHESIS UTILIZING SCENE-LEVEL FEATURES AND PIXEL-LEVEL FEATURES

(71) Applicant: Microsoft Technology Licensing, LLC, Redmond, WA (US)

(72) Inventors: Tianyu Ding, Kirkland, WA (US); Haidong Zhu, Alhambra, CA (US); Tianyi Chen, Redmond, WA (US); Ilya Dmitriyevich Zharkov, Redmond, WA (US); Luming Liang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 18/545,206

(22) Filed: Dec. 19, 2023

(65) Prior Publication Data

US 2025/0203052 A1      Jun. 19, 2025

(51) Int. Cl.
H04N 13/117        (2018.01)
G06T 7/90        (2017.01)
(Continued)

(52) U.S. Cl.
CPC ............. H04N 13/117 (2018.05); G06T 7/90 (2017.01); G06V 10/44 (2022.01); G06V 10/56 (2022.01);
(Continued)

(58) Field of Classification Search
CPC .................... H04N 13/117; G06T 7/90; G06T 2207/10024; G06T 2207/20084; G06V 10/56; G06V 10/771; G06V 10/44
See application file for complete search history.

(56) References Cited

U.S. PATENT DOCUMENTS 11,640,690 B2 *   5/2023   Garbin ................... G06T 15/50
                                                     345/423
2021/0390761 A1 *  12/2021  Kowalski .............. G06T 15/205
(Continued)

OTHER PUBLICATIONS

Qi, Zipeng, et al. "Implicit ray transformers for multiview remote sensing image segmentation." IEEE Transactions on Geoscience and Remote Sensing 61 (2023): 1-15. (Year: 2023).*

(Continued)

*Primary Examiner* — Yu Chen

(74) *Attorney, Agent, or Firm* — Shook, Hardy & Bacon L.L.P.

(57)        ABSTRACT

The technology described herein provides an improved framework for novel view synthesis utilizing scene-level features and pixel-level features. In particular, the technology provides semantic representations corresponding to the scene, along with semantic representations corresponding to the each pixel, so that inherent interconnections within objects in the scene can be determined by transformer encoders that would not otherwise be determined by the pixel-level feature representations alone. In this regard, the technology described herein improves the generalizability of Neural Radiance Fields (NeRF) based techniques to novel scenes to avoid the need for retraining for specific scenes and the few-shot capability of NeRF-based techniques to render novel views using a limited number of reference images.

20 Claims, 7 Drawing Sheets

(51) Int. Cl.
    *G06V 10/44*       (2022.01)
    *G06V 10/56*       (2022.01)
    *G06V 10/771*     (2022.01)

(52) U.S. Cl.
    CPC .. *G06V 10/771* (2022.01); *G06T 2207/10024*
          (2013.01); *G06T 2207/20084* (2013.01)

(56)            References Cited

U.S. PATENT DOCUMENTS

2024/0169662 A1\*   5/2024   Sajjadi .................. G06T 15/205
2025/0157133 A1\*   5/2025   Snavely .................. G06T 15/20

OTHER PUBLICATIONS

Chen, et al., "MVSNeRF: Fast Generalizable Radiance Field Reconstruction From Multi-View Stereo", In Proceedings of the IEEE/CVF International Conference on Computer Vision, Oct. 11, 2021, pp. 14124-14133.

Johari, et al., "GeoNeRF: Generalizing NeRF with Geometry Priors", In Proceedings of the IEEE/CVF Conference on Computer Vision and Pattern Recognition, Jun. 19, 2022, pp. 18365-18375.

Mildenhall, et al., "NeRF: Representing Scenes as Neural Radiance Fields for View Synthesis", In Proceedings of the European Conference on Computer Vision, Aug. 23, 2020, pp. 405-421.

Qi, et al., "PointNet: Deep Learning on Point Sets for 3D Classification and Segmentation", In Proceedings of the IEEE Conference on Computer Vision and Pattern Recognition, Jul. 21, 2017, pp. 652-660.

Varma, et al., "Is Attention All That NeRF Needs?", In Proceedings of The Eleventh International Conference on Learning Representations, May 1, 2023, pp. 1-22.

Tewari, et al., "Advances in Neural Rendering", In Journal of Computer Graphics Forum, vol. 41, Issue 2, May 24, 2022, pp. 703-735.

Yu, et al., "PixelNeRF: Neural Radiance Fields from One or Few Images", In Proceedings of the IEEE/CVF Conference on Computer Vision and Pattern Recognition, Jun. 19, 2021, pp. 4578-4587.

\* cited by examiner

TRAINING DATA <u>310</u>

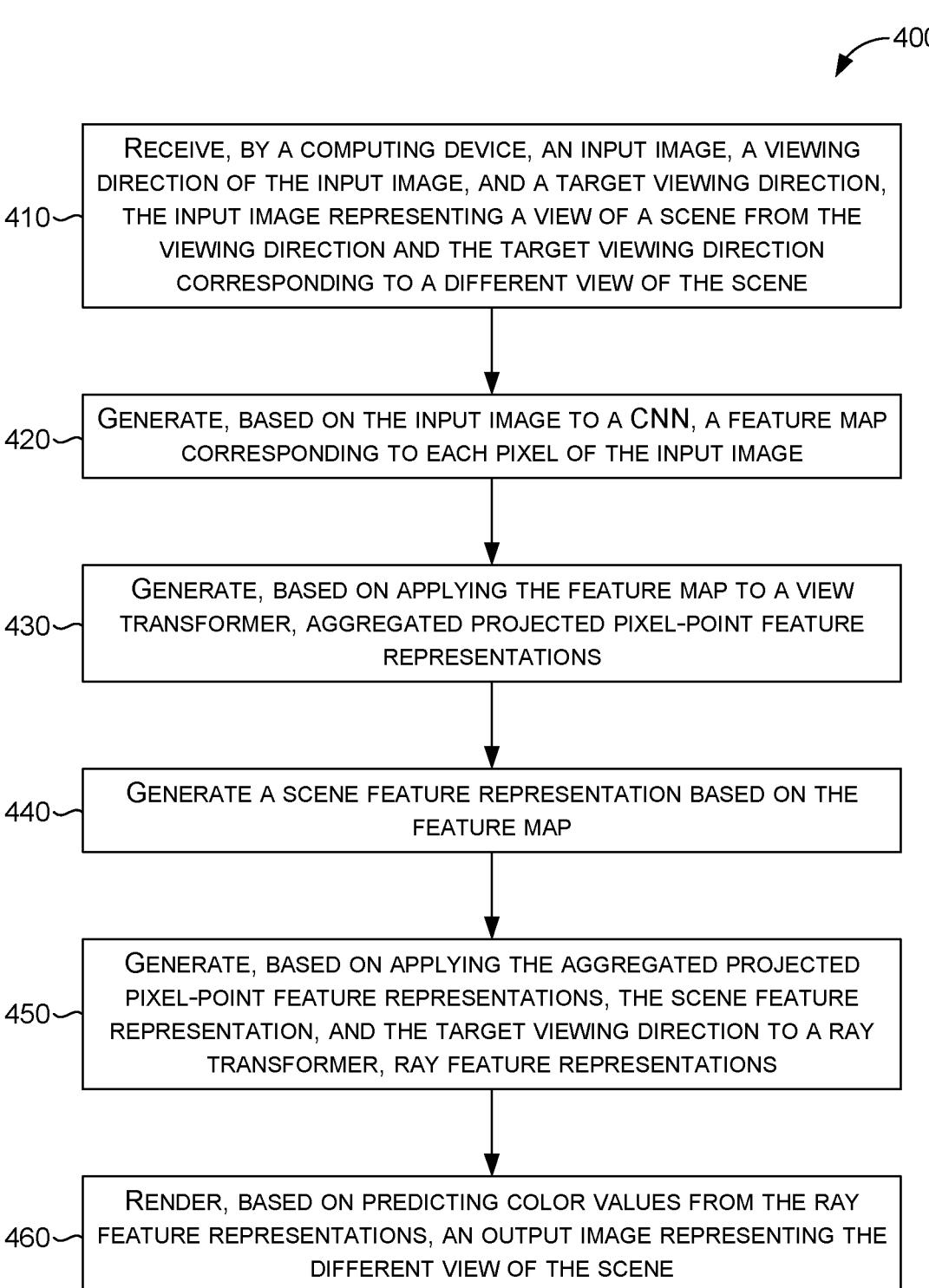

400

410 — RECEIVE, BY A COMPUTING DEVICE, AN INPUT IMAGE, A VIEWING DIRECTION OF THE INPUT IMAGE, AND A TARGET VIEWING DIRECTION, THE INPUT IMAGE REPRESENTING A VIEW OF A SCENE FROM THE VIEWING DIRECTION AND THE TARGET VIEWING DIRECTION CORRESPONDING TO A DIFFERENT VIEW OF THE SCENE

420 — GENERATE, BASED ON THE INPUT IMAGE TO A CNN, A FEATURE MAP CORRESPONDING TO EACH PIXEL OF THE INPUT IMAGE

430 — GENERATE, BASED ON APPLYING THE FEATURE MAP TO A VIEW TRANSFORMER, AGGREGATED PROJECTED PIXEL-POINT FEATURE REPRESENTATIONS

440 — GENERATE A SCENE FEATURE REPRESENTATION BASED ON THE FEATURE MAP

450 — GENERATE, BASED ON APPLYING THE AGGREGATED PROJECTED PIXEL-POINT FEATURE REPRESENTATIONS, THE SCENE FEATURE REPRESENTATION, AND THE TARGET VIEWING DIRECTION TO A RAY TRANSFORMER, RAY FEATURE REPRESENTATIONS

460 — RENDER, BASED ON PREDICTING COLOR VALUES FROM THE RAY FEATURE REPRESENTATIONS, AN OUTPUT IMAGE REPRESENTING THE DIFFERENT VIEW OF THE SCENE

*FIG. 4*

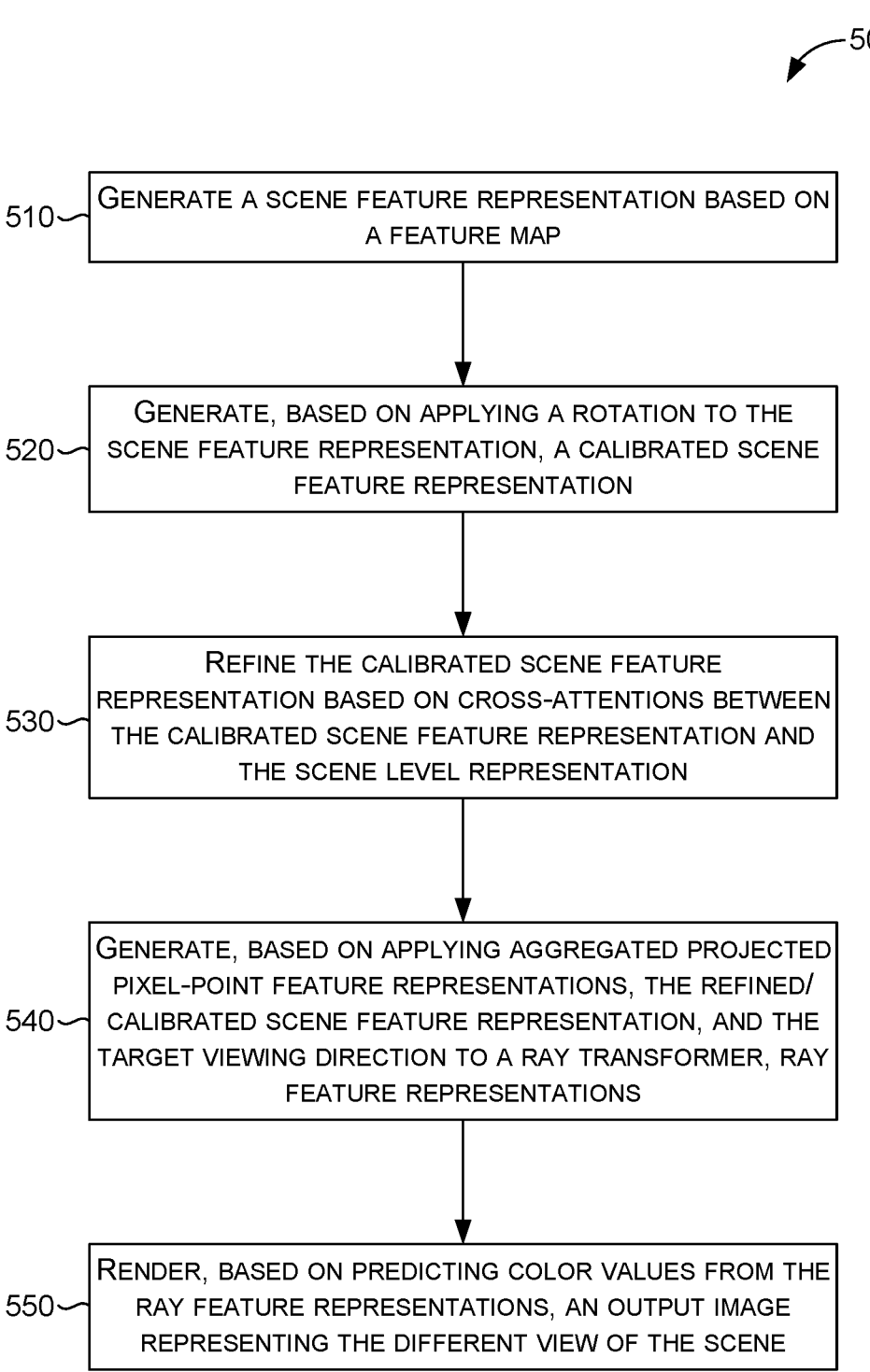

510 — GENERATE A SCENE FEATURE REPRESENTATION BASED ON A FEATURE MAP

520 — GENERATE, BASED ON APPLYING A ROTATION TO THE SCENE FEATURE REPRESENTATION, A CALIBRATED SCENE FEATURE REPRESENTATION

530 — REFINE THE CALIBRATED SCENE FEATURE REPRESENTATION BASED ON CROSS-ATTENTIONS BETWEEN THE CALIBRATED SCENE FEATURE REPRESENTATION AND THE SCENE LEVEL REPRESENTATION

540 — GENERATE, BASED ON APPLYING AGGREGATED PROJECTED PIXEL-POINT FEATURE REPRESENTATIONS, THE REFINED/ CALIBRATED SCENE FEATURE REPRESENTATION, AND THE TARGET VIEWING DIRECTION TO A RAY TRANSFORMER, RAY FEATURE REPRESENTATIONS

550 — RENDER, BASED ON PREDICTING COLOR VALUES FROM THE RAY FEATURE REPRESENTATIONS, AN OUTPUT IMAGE REPRESENTING THE DIFFERENT VIEW OF THE SCENE

*FIG. 5*

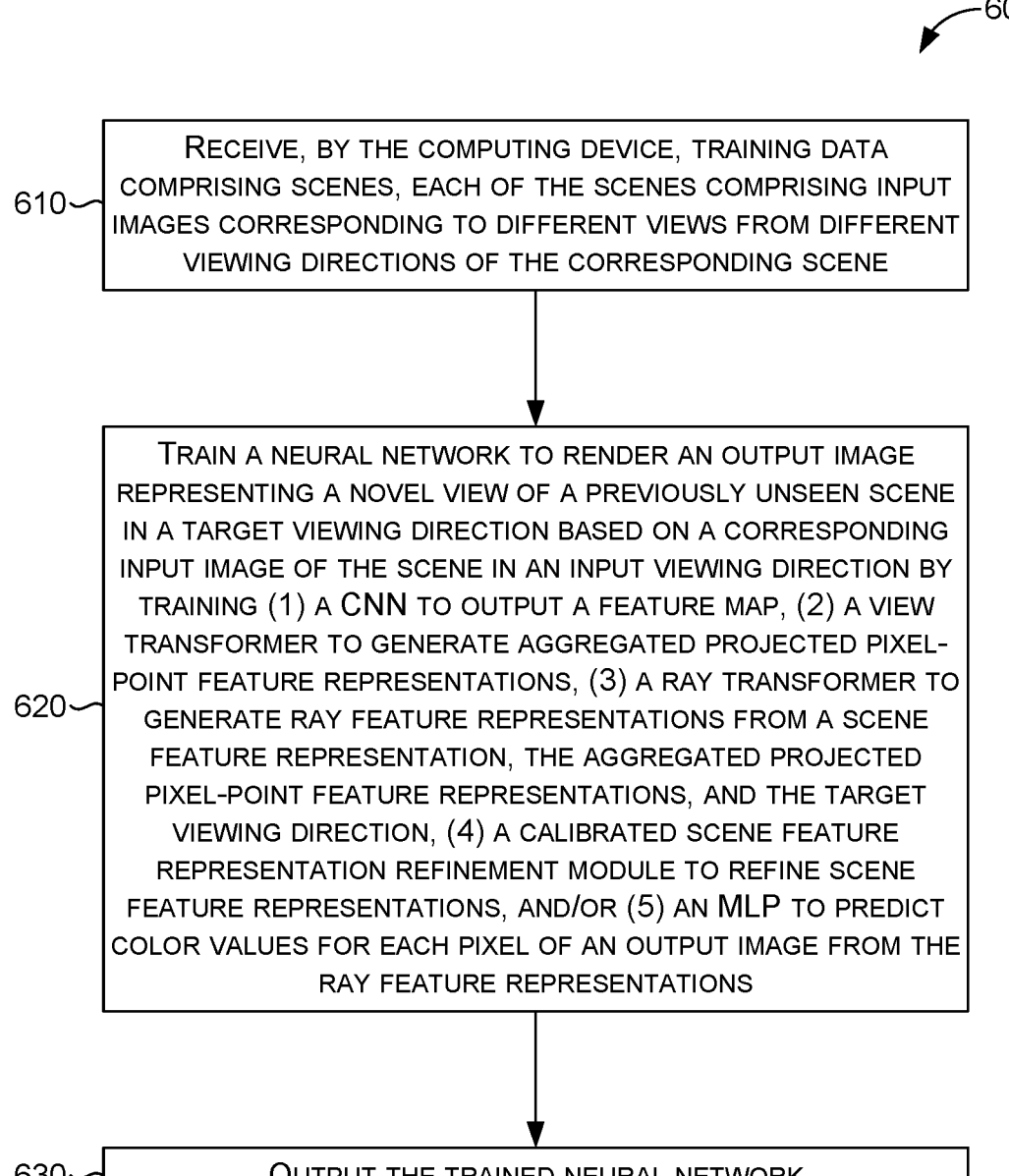

610~ RECEIVE, BY THE COMPUTING DEVICE, TRAINING DATA COMPRISING SCENES, EACH OF THE SCENES COMPRISING INPUT IMAGES CORRESPONDING TO DIFFERENT VIEWS FROM DIFFERENT VIEWING DIRECTIONS OF THE CORRESPONDING SCENE

620~ TRAIN A NEURAL NETWORK TO RENDER AN OUTPUT IMAGE REPRESENTING A NOVEL VIEW OF A PREVIOUSLY UNSEEN SCENE IN A TARGET VIEWING DIRECTION BASED ON A CORRESPONDING INPUT IMAGE OF THE SCENE IN AN INPUT VIEWING DIRECTION BY TRAINING (1) A CNN TO OUTPUT A FEATURE MAP, (2) A VIEW TRANSFORMER TO GENERATE AGGREGATED PROJECTED PIXEL-POINT FEATURE REPRESENTATIONS, (3) A RAY TRANSFORMER TO GENERATE RAY FEATURE REPRESENTATIONS FROM A SCENE FEATURE REPRESENTATION, THE AGGREGATED PROJECTED PIXEL-POINT FEATURE REPRESENTATIONS, AND THE TARGET VIEWING DIRECTION, (4) A CALIBRATED SCENE FEATURE REPRESENTATION REFINEMENT MODULE TO REFINE SCENE FEATURE REPRESENTATIONS, AND/OR (5) AN MLP TO PREDICT COLOR VALUES FOR EACH PIXEL OF AN OUTPUT IMAGE FROM THE RAY FEATURE REPRESENTATIONS

630~ OUTPUT THE TRAINED NEURAL NETWORK

FIG. 6

VIEW SYNTHESIS UTILIZING SCENE-LEVEL FEATURES AND PIXEL-LEVEL FEATURES

BACKGROUND

Novel view synthesis models generate images of a scene from perspectives that were not provided during training. Neural Radiance Fields (NeRF) is a novel view synthesis model that uses neural networks to represent 3D scenes. Generally, NeRF-based techniques work by training a neural network to predict the color and transparency or opacity (e.g., also referred to as density) of each point in a scene, allowing for realistic rendering of complex scenes. The neural network is trained on a dataset of images and corresponding scene geometry. During rendering, the trained network is used to generate images from novel viewpoints by querying the 3D scene representation.

However, previous NeRF techniques are either typically scene-specific, necessitating retraining or fine-tuning for novel scenes, or require a large number of reference views as input for generalizing to novel scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein provides an improved framework for novel view synthesis of a novel scene utilizing scene-level features and pixel-level features. A novel scene is a scene not included in training data used to train the model. At high-level, the technology described herein trains a model using training data that includes images depicting a plurality of different training scenes. The training data may include multiple images of the same scene with each image of the scene depicting a different view (e.g., camera perspective). A description of the view may also be provided as part of the training data. During training, the model learns to generate novel views of scenes in the training data. Once trained, the model of the technology described herein, is able to receive a reference image depicting a novel scene from a first view and generate a new image of the scene from a second view (e.g., target view) that is different from the first view.

The technology described herein is able to generate a higher quality image depicting a novel view of a scene provided in an input image. A test set of images may be used to measure a model's quality. The set of images include test input images and an actual image of a target view. During testing, the test input images are provided to the model and the model generates an output image showing the target view. The quality may be measured by comparing the output image of the target view to the actual image of the target view. Higher quality is associated with a closer match between the output image of the target view and the actual image of the target view. The quality measure may be generated using any suitable image comparison technique.

The quality is improved by a novel model architecture that generates and uses scene representations of both training and reference images, in addition to the pixel representations. In particular, the technology provides semantic representations corresponding to the scene, along with semantic representations corresponding to the each pixel, so that inherent interconnections within objects in the scene can be determined by transformer encoders that would not otherwise be determined by the pixel-level feature representations alone. In this regard, the technology described herein improves the generalizability of NeRF-based techniques to novel scenes to avoid the need for retraining for specific scenes and the few-shot capability of NeRF-based techniques to render novel views using a limited number of reference images.

A novel view synthesis model works by generating novel views of a scene in a target viewing direction of a target camera pose based on reference images of views of the scene that are different from the target viewing direction. Embodiments may include a description of the viewing direction of reference images as input. Alternatively, the viewing direction of the reference images may be determined through image analysis, such as through camera pose estimation techniques. In an aspect, an input image, a viewing direction of the input image, and a target viewing direction are received as input. The model of the technology described herein may generate a feature map of pixels in the input image. If multiple input images are provided, then a feature map may be generated for each of the input images.

The model may then generate projected pixel-point feature representations of each feature map. Projected pixel-point feature representations are computed by projecting each feature map with respect to the viewing direction of its corresponding view. When multiple images are provided and multiple feature maps generated, a view transformer may aggregate the projected pixel-point feature representations into an aggregated projected pixel-point feature representation corresponding to features of a plurality of points in 3D space.

In addition to the pixel-point feature representation, a scene feature representation is generated based on the feature map of the input image. As mentioned, the model uses both pixel data and scene data. In one aspect, the aggregated projected pixel-point feature representations are concatenated with the scene feature representation to generate a global-local embedding. The global-local embedding and the target viewing direction are utilized by a ray transformer to generate ray feature representations. The ray feature representations correspond to each point sampled along each ray in the target viewing direction of the target view. An output image representing the target view of the scene is rendered by predicting color values for each pixel from each of the plurality of ray feature representations. By integrating the scene-level semantic information of the scene feature representation with the per-point feature representations of the aggregated projected pixel-point feature representations, inherent interconnections within objects in the scene can be determined that would not otherwise be determined by the projected pixel-point feature representation alone. This improves the quality of the output image.

The scene feature representation may be generated through a process that includes scene calibration. In one aspect, a calibrated scene feature representation is generated by applying a rotation of the scene level representation. In some embodiments, the rotation of the scene feature representation is computed by applying rotational matrices that model the rotational variations of each input view and the target view. The calibrated scene feature representation can then be utilized in the global-local embedding by the ray transformer to generate the ray feature representations. By calibrating the scene feature representation, pose-specific information can be isolated from the scene-level representation, thereby harmonizing features across input views and mitigating view-specific biases linked to specific camera poses that may introduce uncertainty in the rendering of the novel view of the scene, and/or reducing ambiguity.

In another aspect, the calibrated scene feature representation is refined based on cross-attentions between the calibrated scene feature representation and the scene level representation. In some embodiments, refining the calibrated scene feature representation is performed sequentially at a plurality of stages where each stage includes a view transformer, a ray transformer, and/or a calibrated scene feature representation refinement module. By sequentially refining the calibrated scene feature representation, varying levels of detail are introduced to enhance the semantic features for rendering the novel view of the scene.

BRIEF DESCRIPTION OF THE DRAWINGS

The technology described herein is illustrated by way of example and not limitation in the accompanying figures in which like reference numerals indicate similar elements and in which:

FIG. 4 is a flow diagram showing a method of using a novel view synthesis model to generate a novel view of a scene from a target viewing direction, in accordance with an aspect of the technology described herein;

FIG. 5 is a flow diagram showing a method of calibrating and refining a scene feature representation utilized by a novel view synthesis model to generate a novel view of a scene from a target viewing direction, in accordance with an aspect of the technology described herein;

FIG. 6 is a flow diagram showing a method of training a novel view synthesis model to generate a novel view of a scene from a target viewing direction, in accordance with an aspect of the technology described herein.

DETAILED DESCRIPTION

Figure 1:
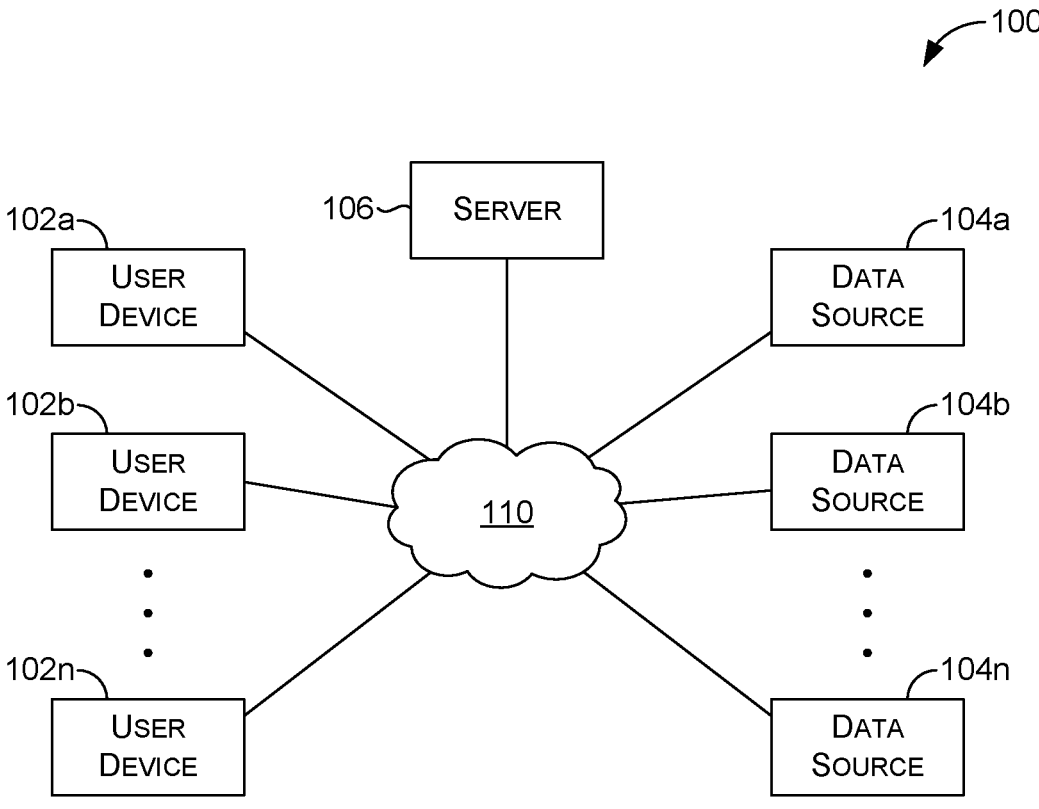
FIG. 1 is a diagram of a computing system suitable for implementations of the technology described herein.

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein provides an improved framework for novel view synthesis of a novel scene utilizing scene-level features and pixel-level features. A novel scene is a scene not included in training data used to train the model. At high-level, the technology described herein trains a model using training data that includes images depicting a plurality of different training scenes. The training data may include multiple images of the same scene with each image of the scene depicting a different view (e.g., camera perspective). A description of the view may also be provided as part of the training data. During training, the model learns to generate novel views of scenes in the training data. Once trained, the model of the technology described herein, is able to receive a reference image depicting a novel scene from a first view and generate a new image of the scene from a second view (e.g., target view) that is different from the first view.

To use real-word examples, the training data may include images of multiple scenes, such as a first scene of a boy and a dog, a second scene of a girl and a horse, a third scene of a woman in a car, a fourth scene of a football team, and a fifth scene of man reading a book. The first scene images may include a first image of the first scene from a first camera view, a second image of the first scene from a second camera view, a third image of the first scene from a third view, and a fourth image of the first scene from a fourth view. The first three images may be provided as training input and the model trained to produce the fourth view. The model training may progress by reducing loss between a training output attempting to depict the fourth view and the ground truth of the fourth view represented in the fourth image. A similar process may occur with the other training images. Once trained, a reference image depicting a fifth scene from a first view, such as a front view of a man running a race, may be input to the trained model, which is able to generate an image of the first scene from a target view, such as a side view of the man running the race.

The technology described herein is able to generate a higher quality image depicting a novel view of a scene provided in an input image. A test set of images may be used to measure a model's quality. The set of images include test input images and an actual image of a target view. During testing, the test input images are provided to the model and the model generates an output image showing the target view. The quality may be measured by comparing the output image of the target view to the actual image of the target view. Higher quality is associated with a closer match between the output image of the target view and the actual image of the target view. The quality measure may be generated using any suitable image comparison technique.

The quality is improved by a novel model architecture that generates and uses scene representations of both training and reference images, in addition to the pixel representations. In particular, the technology provides semantic representations corresponding to the scene, along with semantic representations corresponding to the each pixel, so that inherent interconnections within objects in the scene can be determined by transformer encoders that would not otherwise be determined by the pixel-level feature representations alone. In this regard, the technology described herein improves the generalizability of NeRF-based techniques to novel scenes to avoid the need for retraining for specific scenes and the few-shot capability of NeRF-based techniques to render novel views using a limited number of reference images.

A novel view synthesis model works by generating novel views of a scene in a target viewing direction based on reference images of views of the scene that are different from the target viewing direction. Embodiments may include a description of the viewing direction of reference images as input. Alternatively, the viewing direction of the reference images may be determined through image analysis, such as through camera pose estimation techniques. In an aspect, an input image, a viewing direction of the input image, and a target viewing direction are received as input. The model of the technology described herein may generate a feature map of pixels in the input image. If multiple input images are provided, then a feature map may be generated for each of the input images.

A feature map corresponding to each pixel of the input image and/or set of input images is generated. For example, each view is encoded by the convolutional neural network (CNN) to be a feature map that extracts information from the input image.

The model may then generate projected pixel-point feature representations of each feature map. Projected pixel-point feature representations are computed by projecting each feature map with respect to the viewing direction of its corresponding view. A view transformer aggregates the projected pixel-point feature representations into aggregated projected pixel-point feature representations corresponding to features of a plurality of points in 3D space. In some embodiments, each of the projected pixel-point feature representations of each input image are computed based on a plurality of views with respect to the viewing direction and/or the target viewing direction. For example, projected pixel-point feature representations for each view within a threshold viewing direction, such as $\theta$ and/or $\Phi$ viewing direction angles, to the viewing direction of the input image can be generated, thereby generating each of the projected pixel-point feature representations for each of the views within the threshold viewing direction.

In some embodiments, each of the projected pixel-point feature representations are computed based on the viewing direction of each image in a plurality of input images. For example, each position along a ray is projected by each input image (e.g., each source image) and each corresponding feature vector is interpolated on the image plane from a decoder. The view transformer's positional encoding is used to concatenate the extracted feature vector with the corresponding point coordinate (e.g., each position in 3D space), viewing direction, and/or relative directions of source views with respect to the target view.

In addition to the pixel-point feature representation, a scene feature representation is generated based on the feature map of the input image. A scene feature representation is generated based on the feature map of the input image. In some embodiments, the feature map extracted from each input image by a shared CNN encoder to generate the plurality of aggregated projected pixel-point feature representations is also used to generate the scene feature representation. In some embodiments, the scene feature representation is generated by applying a Global Average Pooling (GAP). In some embodiments, the scene feature representation is generated by applying a GAP to the output feature map of each input image to generate a global feature vector for each input image. The global feature vectors for each input image of the scene are averaged to generate the scene feature representation. In some embodiments, the global feature vectors for each input image are a single vector for each entire input image and/or the scene feature representation is a single vector for the entire scene.

As mentioned, the model uses both pixel data and scene data. In one aspect, the aggregated projected pixel-point feature representations are concatenated with the scene feature representation to generate a global-local embedding. The global-local embedding and the target viewing direction are utilized by a ray transformer to generate ray feature representations. The ray feature representations correspond to each point sampled along each ray in the target viewing direction of the target view. An output image representing the target view of the scene is rendered by predicting color values for each pixel from each of the plurality of ray feature representations. By integrating the scene-level semantic information of the scene feature representation with the per-point feature representations of the aggregated projected pixel-point feature representations, inherent interconnections within objects in the scene can be determined that would not otherwise be determined by the projected pixel-point feature representation alone. This improves the quality of the output image.

The scene feature representation may be generated through a process that includes scene calibration. In one aspect, a calibrated scene feature representation is generated by applying a rotation of the scene level representation. In some embodiments, the rotation of the scene feature representation is computed by applying rotational matrices that model the rotational variations of each input view and the target view. The calibrated scene feature representation can then be utilized in the global-local embedding by the ray transformer to generate the ray feature representations. By calibrating the scene feature representation, pose-specific information can be isolated from the scene-level representation, thereby harmonizing features across input views and mitigating view-specific biases linked to specific camera poses that may introduce uncertainty in the rendering of the novel view of the scene, and/or reducing ambiguity.

In another aspect, the calibrated scene feature representation is refined based on cross-attentions between the calibrated scene feature representation and the scene level representation. In some embodiments, the refining of the calibrated scene feature representation is based on cross-attentions between the calibrated scene feature representation and each of the global feature vectors for each input image of the scene that are averaged to generate the scene feature representation. In some embodiments, the refining the calibrated scene feature representation is performed sequentially at a plurality of stages. Each stage includes a view transformer that sequentially refines a plurality of aggregated projected pixel-point feature representations corresponding to features of a plurality of points in 3D space; a ray transformer that sequentially refines a plurality of ray feature representations corresponding to each point sampled along each ray in the target viewing direction of the different view; and/or a calibrated scene feature representation refinement module that sequentially refines the calibrated scene feature representation. By sequentially refining the calibrated scene feature representation, varying levels of detail are introduced to enhance the semantic features for rendering the novel view of the scene.

In another aspect, during training of the model, a Mean Square Error (MSE) loss function is utilized during training by computing the MSE between the actual and predicted pixel values. In some embodiments, a central loss function is utilized during training by computing the loss between the calibrated scene feature representation and each calibrated global feature representation computed for each input image of the scene. In some embodiments, a point-wise perceptual loss is utilized during training by computing a perceptual loss between an inpainted image and the ground truth target image to guide the training process at the whole image level.

The aggregated projected pixel-point feature representations, the scene feature representation, and the target viewing direction are utilized by a ray transformer to generate ray feature representations. The ray feature representations correspond to each point sampled along each ray in the target viewing direction of the different view. In some embodiments, the aggregated projected pixel-point feature representations are concatenated with the scene feature representation to generate a global-local embedding that is applied to the ray transformer. The global-local embedding is subject to the self-attention mechanism of the ray transformer. In some embodiments, in order to maintain dimensional consistency, an MLP, such as a two-layer MLP, is utilized to project the global-local embedding back to the original dimension of the aggregated projected pixel-point feature representations.

An output image representing the different view of the scene is rendered by predicting color values for each pixel from each of the plurality of ray feature representations. In some embodiments, an MLP is utilized to map each of the plurality of ray feature representations to color values, such as the red-green-blue color model (RGB).

By integrating the scene-level semantic information of the scene feature representation with the per-point feature representations of the aggregated projected pixel-point feature representations, inherent interconnections within objects in the scene can be determined that would not otherwise be determined by the projected pixel-point feature representation alone.

In one aspect, a calibrated scene feature representation is generated by applying a rotation of the scene level representation. In some embodiments, the rotation of the scene feature representation is computed by applying a rotational matrices that model the rotational variations of each input view and the target view. In some embodiments, a calibrated global feature representation is computed for each input image of the scene and the calibrated scene feature representation is computed by averaging each of the calibrated global feature representation of each of the input images of the scene. In some embodiments, flattening and inverse flattening operations are used to compute the calibrated scene feature representation based on the inverse of the extrinsic matrix of each input view, the extrinsic matrix of the target view, and/or the scene feature representation, and/or each corresponding global feature representation of each input view.

By calibrating the scene feature representation, pose-specific information can be isolated from the scene-level representation, thereby harmonizing features across input views, mitigating view-specific biases linked to specific camera poses that may introduce uncertainty in the rendering of the novel view of the scene, and/or reducing ambiguity.

The technology described herein may use a Generalizable NeRF Transformer model (GNT). Generally, NeRF models represent a 3D scene as a radiance field where each spatial coordinate, together with the viewing direction is mapped to a color (e.g., RGB) and density. Base NeRF models may parameterize the radiance field using a multilayer perception (MLP) and recover the scene in a backward optimization fashion, inherently limiting NeRF from generalizing to new scenes.

The Generalizable NeRF Transformer model (GNT) uses a feed-forward scheme to convert multi-view images of a scene into a 3D representation of the scene, but instead of using only physical variables (e.g., color and density), a 3D scene is modeled as a coordinate-aligned feature field. In this regard, a function invariant to the permutation of input images is utilized to aggregate different views into a coordinate-aligned feature field, and extract features at a specific location. Thus, pixels of a tree depicted in a first view of a scene should be aligned with pixels of the same tree depicted from a second view.

GNT models utilizes transformers to aggregate pixel-level features encoded from input images. The view transformer is used to fuse projected pixel-level features from reference views and the ray transformer is used to combine features from different points along a ray, thereby eliminating the need for volume rendering. However, as the view transformer and ray transformer only rely on pixel-level feature representations, the capability of GNT is restricted from obtaining a holistic scene understanding and resolving depth ambiguities between points along the rays, especially when reference views are limited in few-shot novel view synthesis. For example, relying solely on pixel-level features ignores the inherent interconnections within objects in the scene as the prediction of each pixel is treated independently. As the number of input reference images are limited, the data scarcity amplifies prediction ambiguity because the prediction is significantly influenced by the biases of the input camera views.

The technologies herein are described using key terms wherein definitions are provided. However, the definitions of key terms are not intended to limit the scope of the technologies described herein.

In the context of Neural Radiance Field (NeRF) image generation, a scene refers to the visual objects (e.g., sky, green spaces, roads, cars, people, animals) to be rendered by the NeRF model. The scene is initially represented by one or more input images. A NeRF works by taking the one or more input images representing a scene and building a volumetric (e.g., 3D) representation of the scene. The representation of a 3D scene can be used to render the scene into high-quality images from a novel view point. A novel view point is a view not found in the input image(s).

Having briefly described an overview of aspects of the technology described herein, an operating environment in which aspects of the technology described herein may be implemented is described below in order to provide a general context for various aspects.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102b through 102n; a number of data sources, such as data sources 104a and 104b through 104n; server 106; and network 110. Each of the components shown in FIG. 1 is implemented via any type of computing device, such as computing device 700 illustrated in FIG. 7, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 700 in FIG. 7. For instance, server 106 is provided via multiple devices arranged in a distributed environment that collectively provides the functionality described herein. Additionally, other components not shown may also be included within the distributed environment.

User devices 102b through 102n can be client user devices on the client-side of operating environment 100, while server 106 can be on the server-side of operating environment 100. Server 106 can comprise server-side software designed to work in conjunction with client-side software on user devices 102b through 102n so as to implement any combination of the features and functionalities discussed in the present disclosure. In one aspect, the server hosts a novel view synthesis model and novel view synthesis model training system. In aspects, the user devices 102b through 102n provide a user interface to the novel view synthesis model 240 and novel view synthesis model training system shown in operating environment 300A. This division of operating environment 100 is provided to illustrate one example of a suitable environment, and there is no requirement for each implementation that any combination of server 106 and user devices and 102b through 102n remain as separate entities.

In some embodiments, user devices 102b through 102n comprise any type of computing device capable of use by a user. For example, in one embodiment, user devices 102b through 102n are the type of computing device 700 described in relation to FIG. 7. By way of example and not limitation, a user device is embodied as a personal computer (PC), a laptop computer, a mobile device, a smartphone, a tablet computer, a virtual-reality (VR) or augmented-reality (AR) device or headset, a handheld communication device, an embedded system controller, a consumer electronic device, a workstation, any other suitable computer device, or any combination of these delineated devices.

In some embodiments, data sources 104a and 104b through 104n comprise data sources and/or data systems, which are configured to make data available to any of the various constituents of operating environment 100 or system 200 described in connection to FIG. 2. The data sources 104a and 104b through 104n may include training data, such as training data 310 of FIG. 3A for training the untrained model 320, for the novel view synthesis model 240 and/or input, such as input view(s) of unseen scene 330 of FIG. 3B, and output, such as novel view(s) of unseen scene 350 of FIG. 3B, from a trained model 340. Certain data sources 104a and 104b through 104n are discrete from user devices 102b through 102n and server 106 or are incorporated and/or integrated into at least one of those components. In one embodiment, one or more of data sources 104a and 104b through 104n comprise one or more sensors, which are integrated into or associated with one or more of the user device(s) 102b through 102n or server 106. For example, the data sources could include a web camera used to interact with a virtual environment.

Figure 2:
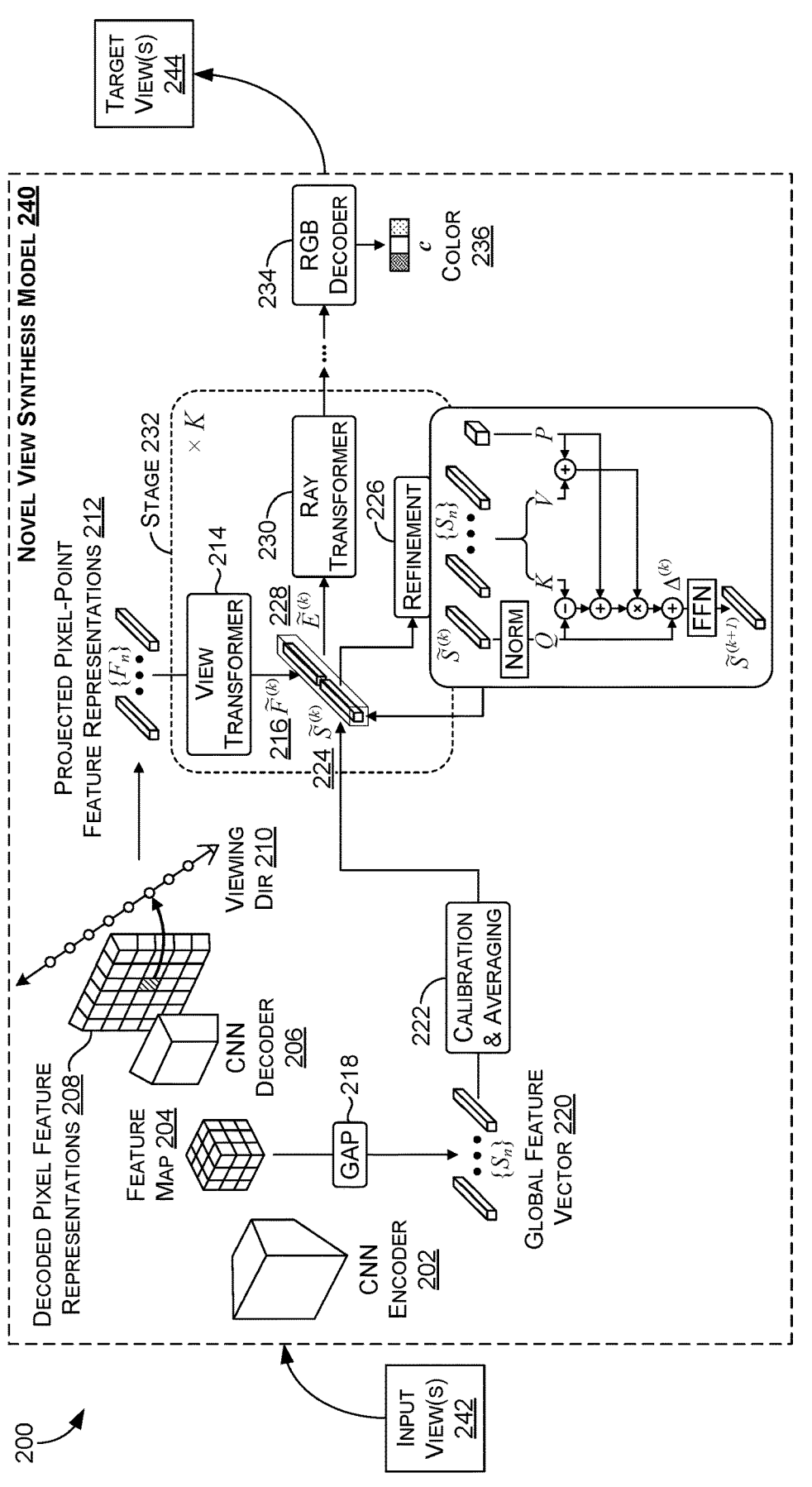
FIG. 2 is a block diagram of an example operating environment of a novel view synthesis model, in accordance with an aspect of the technology described herein.

Operating environment 100 can be utilized to implement one or more of the components of system 200, as described in FIG. 2. Operating environment 100 can also be utilized for implementing aspects of methods 400, 500, and 600 in FIGS. 4, 5, and 6, respectively.

Referring now to FIG. 2 with FIG. 1, a block diagram is provided showing aspects of an example computing system architecture suitable for implementing some embodiments of the disclosure and designated generally as system 200. FIG. 2 illustrates a novel view synthesis model 240 that receives an input images 242 with views of a scene and outputs one or more target views 244 of the scene. The one or more target views 244 are novel, meaning the target views 244 are from different camera perspectives (or viewing directions) than the input images 242 with views of the scene provided.

The system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. These components may be embodied as a set of compiled computer instructions or functions, program modules, computer software services, or an arrangement of processes carried out on one or more computer systems.

In one embodiment, the functions performed by components of system 200 are associated with training and using a novel view synthesis model 240. These components, functions performed by these components, and/or services carried out by these components may be implemented at appropriate abstraction layer(s) such as the operating system layer, application layer, and/or hardware layer of the computing system(s). Alternatively, or in addition, the functionality of these components, and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components and/or computer systems.

The system 200 includes a novel view synthesis model 240 that, once trained, works by generating novel target views 244 of a scene in a target viewing direction based on input images 242 from different viewing directions of the scene. In this regard, an input image 242, a viewing direction of the input image, such as viewing direction 210, and a target viewing direction of the target view 244 are received as input.

In some embodiments, a description of the viewing direction of reference images is received as input. For example, the camera pose of each reference image may be provided as input and may include data corresponding to viewing direction angles $\theta$ and/or $\Phi$ of viewing direction d. Alternatively, the viewing direction of the reference images may be determined through image analysis. For example, camera pose estimation techniques, such as Structure from Motion (SfM), (e.g., COLMAP), Multi-View Stereo (MVS) simultaneous localization and mapping (SLAM), perspective-in-point (PnP), random sample consensus (RANSAC), neural network-based approaches, and/or the like, may be utilized to determine the camera pose and or viewing direction of each reference image received as input.

The technology described herein may use a Generalizable NeRF Transformer model (GNT). Generally, NeRF models represent a 3D scene as a radiance field where each spatial coordinate, together with the viewing direction is mapped to a color (e.g., RGB) and density. Base NeRF models may parameterize the radiance field using a multilayer perception (MLP) and recover the scene in a backward optimization fashion, inherently limiting NeRF from generalizing to new scenes.

The Generalizable NeRF Transformer model (GNT) uses a feed-forward scheme to convert multi-view images of a scene into a 3D representation of the scene, but instead of using only physical variables (e.g., color and density), a 3D scene is modeled as a coordinate-aligned feature field. In this regard, a function invariant to the permutation of input images is utilized to aggregate different views into a coordinate-aligned feature field, and extract features at a specific location. Thus, pixels of a tree depicted in a first view of a scene should be aligned with pixels of the same tree depicted from a second view.

In GNT models, transformers are used as a set of aggregation functions. As plugging in attention to globally attend to every pixel in the source images may be memory prohibitive and lacks multi-view geometric priors, epipolar geometry is an inductive bias that restricts each pixel to only attend to pixels that lie on the corresponding epipolar lines of the neighboring views.

Thus, GNT models may first encode each view to be a feature map that extracts not only shading information, but also material, semantics, and local/global complex light transport via its multi-scale architecture. To obtain the feature representation at a position, the position is projected to every source image and the feature vector is interpolated on the image plane. A transformer encoder (referred to herein as a "view transformer") is utilized to combine all the feature vectors. The view transformer is a transformer encoder that utilizes computations of pixel feature vectors. The pixel feature vectors are computed by projecting positions onto each image plane by applying an extrinsic matrix and the feature vector is computed at each position via bilinear interpolation on the feature grids. In the generalizable NeRF model, the positional encoding of the view transformer is used to concatenate the extracted feature vector with point coordinate, viewing direction, and relative directions of source views with respect to the target view.

Previous NeRF technology uses volume rendering, which simulates outgoing radiance from a volumetric field, by rendering the color of a pixel by integrating the color and density along the ray cast from that pixel. In GNT models, volume rendering is regarded as a weighted aggregation of all the point-wise output, in which the weights are globally dependent on the other points for occlusion modeling. In this regard, the weighted aggregation of all the point-wise output can be learned by a transformer (referred to herein as a "ray transformer"), such that point-wise colors can be mapped to token features, and attention scores correspond to transmittance (the blending weights). In GNT, to render the color of a ray, the feature representation for each point sampled on the ray is computed. Additionally, position encoding of spatial location and view direction are added into the feature representation. In GNT, the rendered color is obtained by feeding the sequence corresponding to each feature representation for each point sampled on the ray into the ray transformer, mean pooling is performed over all the predicted tokens, and the pooled feature vector is mapped to RGB via an MLP.

Continuing with FIG. 2, CNN encoder 202 generates a feature map 204 corresponding to each pixel of the input image and/or set of input images. Projected pixel-point feature representations 212 are computed by projecting decoded pixel feature representation 208 of each feature map 204 in viewing direction 210 of the corresponding view of the input image 242. A view transformer 214 aggregates the projected pixel-point feature representations 212 into aggregated projected pixel-point feature representations 216 corresponding to features of a plurality of points in 3D space. In some embodiments, each of the projected pixel-point feature representations 212 of each input image are computed based on a plurality of views with respect to the viewing direction and/or the target viewing direction. For example, projected pixel-point feature representations 212 for each view within a threshold viewing direction, such as θ and/or Φ viewing direction angles of viewing direction d, to the viewing direction 210 of the input image 242 can be generated, thereby generating each of the projected pixel-point feature representations 212 for each of the views within the threshold viewing direction.

In some embodiments, each of the projected pixel-point feature representations 212 are computed based on the viewing direction 210 of each image in a set of input images 242. For example, each position along a ray of viewing direction 210 is projected by each input image (e.g., each source image) and each corresponding feature vector is interpolated on the image plane from a decoder. The positional encoding of the view transformer 214 is used to concatenate the extracted feature representation 212 with the corresponding point coordinate (e.g., each position in 3D space), viewing direction, and/or relative directions of source views with respect to the target view as aggregated projected pixel-point feature representations.

In one aspect, previous NeRF techniques aim to render 3D scenes by predicting both the density and RGB values at points where light rays intersect the radiance field. For a query point $x \in \mathbb{R}^3$ and a viewing direction d on the unit sphere $\mathbb{S}^2$ in 3D space, the NeRF model $\mathcal{F}$ is defined as:

$$\sigma, c = \mathcal{F}(x, d) \qquad (1)$$

Here, $\sigma \in \mathbb{R}$ and $c \in \mathbb{R}^3$ denote the density and the RGB values, respectively. After computing these values for a collection of discretized points along each ray, volume rendering techniques are employed to calculate the final RGB values for each pixel, thus constructing the image.

However, previous NeRF models $\mathcal{F}$ are limited by their requirement for scene-specific training, making it unsuitable for generalizing to novel scenes. In contrast, the generalizable NeRF model of the technology described herein, denoted by $\mathcal{F}_G$, is designed to render images of novel scenes without per-scene training. Given N reference images $$\{I_n\}_{n=1}^N,$$

an encoder-based generalizable NeRF model $\mathcal{F}_G$ decouples the object representation from the original NeRF by using an encoder to extract per-pixel feature maps $$\{F_n\}_{n=1}^N$$

from the input images. To synthesize a pixel associated with a point x along a ray in direction d, it projects $$\{F_n\}_{n=1}^N$$

from nearby views and aggregates this multi-view pixel-level information using techniques such as average pooling or cost volumes. This results in a fused feature embedding $\tilde{F}$, allowing $\mathcal{F}_G$ to predict density $\sigma$ and RGB values c for each point along the ray, as expressed by:

$$\sigma, c = \mathcal{F}_G\left(x, d, \tilde{F}\right) \qquad (2)$$

As mentioned previously, GNT models use transformers to aggregate pixel-level features into $\tilde{F}$. GNT uses a view transformer 214 to fuse projected pixel-level features from reference views and a ray transformer to combine features from different points along a ray, eliminating the need for volume rendering.

Continuing with FIG. 2, a scene feature representation 224 is generated based on the feature map 204 of the input image 242 of a scene. The feature map 204 may be produced by a CNN encoder. In an aspect, the scene feature representation 224 is generated by applying a Global Average Pooling 218 to the feature map 204 to produce an image feature vector. In embodiments where multiple input images of a scene are provided, a GAP 218 may be applied to the output feature map 204 of each input image 242 to generate a global feature vector 220 for the scene. The global feature vectors 220 for each input image of the scene are averaged in calibration by averaging component 222 to generate the scene feature representation 224. In some embodiments, the global feature vectors 220 for each input image 242 are a single vector for each entire input image and/or the scene feature representation 224 is a single vector for the entire scene.

The aggregated projected pixel-point feature representations 216, the scene feature representation 224, and the target viewing direction of the target view 244 are utilized by a ray transformer 230 to generate ray feature representations. The ray feature representations correspond to each point sampled along each ray in the target viewing direction of the target view 244. In some embodiments, the aggregated projected pixel-point feature representations 216 are concatenated with the scene feature representation 224 to generate a global-local embedding 228 that is applied to the ray transformer 230. The global-local embedding 228 is subject to the self-attention mechanism of the ray transformer 230. In some embodiments, in order to maintain dimensional consistency, an MLP, such as a two-layer MLP, is utilized to project the global-local embedding 228 back to the original dimension of the aggregated projected pixel-point feature representations 216.

An output image representing the target view 244 of the scene is rendered by predicting color values 236 for each pixel from each of the plurality of ray feature representations by RGB decoder 234. In some embodiments, an MLP is utilized to map each of the plurality of ray feature representations to color values, such as RGB.

By integrating the scene-level semantic information of the scene feature representation with the per-point feature representations of the aggregated projected pixel-point feature representations, inherent interconnections within objects in the scene can be determined that would not otherwise be determined by the projected pixel-point feature representation alone.

In one aspect, semantic representations of the scene can be utilized to enrich the scene-level understanding. GAP 218 can be applied to the C-dimensional output feature map of a shared CNN encoder 206, generating N global feature vectors $$\{S_n\}_{n=1}^N$$

corresponding to each input view. The feature vectors are then averaged to form a unified scene-level representation S, i.e., $$S = \frac{1}{N}\sum_{n=1}^N S_n \in \mathbb{R}^c. \qquad (3)$$

GNT uses a view transformer to aggregate pixel-level features into an L-dimensional vector $\tilde{F}$. The novel view synthesis model 240 concatenates $\tilde{F}$ with S to construct a global-local embedding E, as formulated by:

$$E = Concat\left(\tilde{F}, S\right) \in \mathbb{R}^{L+C}. \qquad (4)$$

The combined embedding E is then subjected to the self-attention mechanism of ray transformer 230. By enabling the scene-level semantic representation(S) to integrate with per-point features ($\tilde{F}$), a more nuanced understanding is offered at both levels and allows each point to selectively draw from the scene-level information. To maintain dimensional consistency across the input and output layers of multiple transformer modules, a two-layer MLP can be used to project the enhanced features back to the original dimension L of the per-point embedding $\tilde{F}$.

The integration of the scene-level semantic representation S, generated by averaging of global feature vectors improves rendering quality.

In some embodiments, calibration and averaging component 222 generates a calibrated scene feature representation, which is then used as the scene feature representation 224, by applying a rotation of the scene level representation. In some embodiments, the rotation of the scene feature representation 224 is computed by applying a rotational matrices that model the rotational variations of each input view and the target view by calibration and averaging component 222. In some embodiments, a calibrated global feature representation is computed for each input image of the scene and the scene feature representation 224 is computed by averaging each of the calibrated global feature representations of each of the input images of the scene. In some embodiments, flattening and inverse flattening operations are used to compute the calibrated scene feature representation, which is then used as the scene feature representation 224, by calibration and averaging component 222 based on the inverse of the extrinsic matrix of each input view, the extrinsic matrix of the target view, and/or the scene feature representation, and/or each corresponding global feature representation of each input view.

By calibrating the scene feature representation, pose-specific information can be isolated from the scene-level representation, thereby harmonizing features across input views, mitigating view-specific biases linked to specific camera poses that may introduce uncertainty in the rendering of the novel view of the scene, and/or reducing ambiguity.

In one aspect, calibration and averaging component 222 utilizes a semantic calibration technique using feature rotation. The adjustment aligns the semantic representation across different camera poses. Calibrated semantic representations $$\{\tilde{S}_n\}_{n=1}^{N}$$

are calculated from the N original semantic representations $$\{S_n\}_{n=1}^{N}$$

derived from the reference views. The respective rotation matrices $$\{T_n\}_{n=1}^{N}$$

can be used to model the rotational variations between each input view and the target view. The alignment of the original semantic features can be performed as follows:

$$\tilde{S}_n = \mathcal{P}\big(T_n \cdot \mathcal{P}^{-1}(S_n)\big), \text{ where } T_n = T_{out}^{w2c} \cdot T_n^{c2w}. \quad (5)$$

Here, $$T_n^{c2w}$$

is the inverse of the extrinsic matrix used for $I_n$, and $$T_{out}^{w2c}$$

out is the extrinsic matrix for the target view. $\mathcal{P}(\cdot)$ and $\mathcal{P}^{-1}(\cdot)$ are the flattening and inverse flattening operations, which reshape the feature to a 1D vector of shape 1-by-C and a 2D matrix of shape $$3\text{--by--}\frac{c}{3},$$

respectively.

In one aspect, for the extrinsic matrix, only the top-left 3×3 submatrix that accounts for rotation is considered. GAP can be used to condense feature maps of various sizes into a 1-by-C feature vector, thereby eliminating the need for scaling parameters in the semantic representation. As a result, the semantic calibration technique using feature rotation by calibration and averaging component 222 is adaptable to different camera configurations as the modeling of the intrinsic matrix can be unnecessary.

The calibrated semantic features $$\{\tilde{S}_n\}_{n=1}^{N}$$

for each reference view can be averaged to obtain the calibrated scene-level semantic representation $\tilde{S}$, $$\tilde{S} = \frac{1}{N}\sum_{n=1}^{N}\tilde{S}_n \in \mathbb{R}^c. \quad (6)$$

The pixel-level fused feature $\tilde{F}$ can be concatenated with the calibrated scene-level semantic representation $\tilde{S}$ to form the final global-local embedding $\tilde{E}$:

$$\tilde{E} = Concat\big(\tilde{F}, \tilde{S}\big) \in \mathbb{R}^{L+C}. \quad (7)$$

The global-local embedding 228 can then feed into ray transformers 230, passing through self-attention mechanisms. In some embodiments, multiple view transformers and ray transformers are stacked alternately for sequential feature processing by stage 232. The last ray transformer integrates features from multiple points along a ray to yield the final RGB value. The corresponding feature representations at stage k can be denoted as $\tilde{F}^{(k)}$ and $\tilde{E}^{(k)}$. In some embodiments, the calibrated semantic representation $\tilde{S}$ remains constant across these stages.

In one aspect, the unrefined scene feature representation is refined by refinement module 226 based on cross-attentions between the calibrated scene feature representation and the scene level representation. In some embodiments, the refining of the unrefined scene feature representation is based on cross-attentions between the calibrated scene feature representation and each of the global feature vectors 220 for each input image of the scene that are averaged to generate the scene feature representation. In some embodiments, the refining the calibrated scene feature representation is performed sequentially at a plurality of stages 232. In some embodiments, each stage includes a view transformer 214 that sequentially refines a plurality of aggregated projected pixel-point feature representations corresponding to features of a plurality of points in 3D space; a ray transformer 230 that sequentially refines a plurality of ray feature representations corresponding to each point sampled along each ray in the target viewing direction of the different view; and/or a scene feature representation refinement module 226 that sequentially refines the scene feature representation 224. By sequentially refining the calibrated scene feature representation, varying levels of detail are introduced to enhance the semantic features for rendering the novel view of the scene.

In one aspect, a sequential semantic feature component of the refinement module 226 can progressively enrich features at each stage 232. In some embodiments, the residual $\Delta^{(k)}$ is learned to update $\tilde{S}$ at each stage k as follows:

$$\tilde{S}^{(k+1)} \leftarrow \tilde{S}^k + \Delta^{(k)}. \tag{8}$$

In this regard, $\Delta^{(k)}$ is calculated by first performing specialized cross-attentions between $\tilde{S}^{(k)}$ and the original, uncalibrated per-frame semantic features $$\{S_n\}_{n=1}^N,$$

followed by summation. The refinement by refinement module 226 fuses information from different source views to enrich the scene-level semantic representation with features from each reference frame. With this sequential refinement, $\tilde{S}^k$ is combined with $\tilde{F}^{(k)}$ at each stage 232, yielding a stage-specific global-local embedding $\tilde{E}^{(k)}$, which is utilized by ray transformer 230.

Figure 3A:
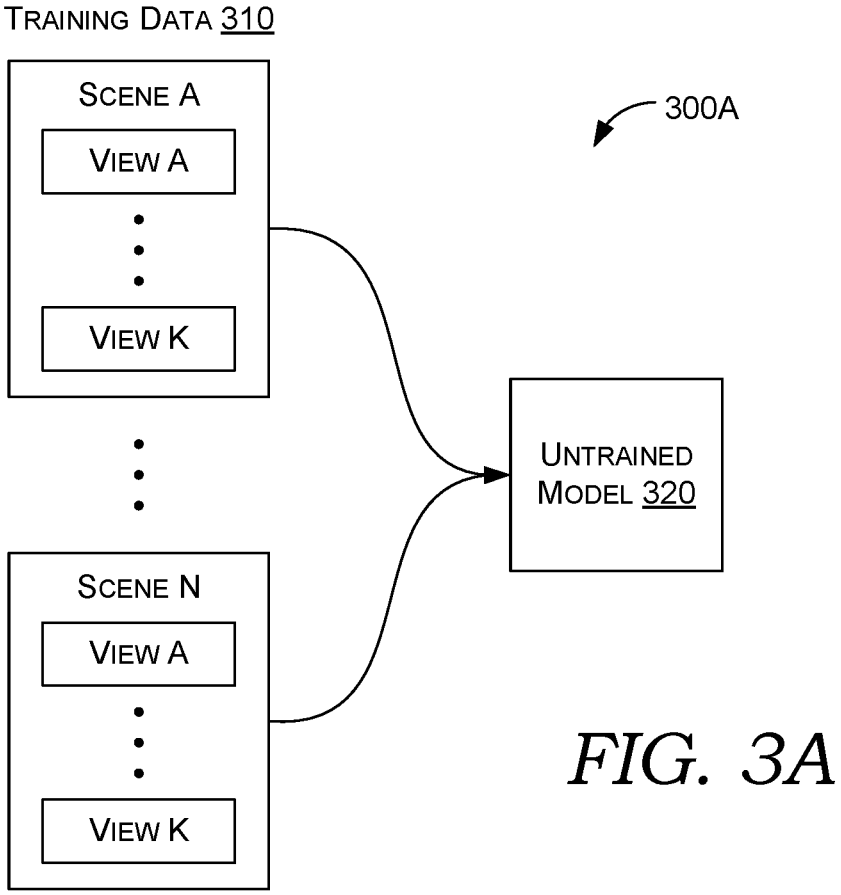
FIG. 3A is a block diagram of an example operating environment for training a novel view synthesis model, in accordance with an aspect of the technology described herein.

Turning now to FIG. 3A, the operation of training of untrained model 320 is illustrated in operating environment 300A, such as during training of novel view synthesis model 240 of FIG. 2. As shown in FIG. 3A, untrained model 320 receives training data 310. The training data includes any number of scenes and any number of views per scene. In some embodiments, the number of views for each scene and/or the corresponding viewing direction utilized as training data 310 are randomly determined. For example, a number of 3D scenes are selected. For each 3D scene, the number of different views of each scene are randomly determined where each view from a different corresponding viewing direction of the 3D object. In this regard, for a first scene, such as scene A, it may be randomly determined that the first scene should have nine (9) views for use as training data 310. The corresponding viewing direction of each of the nine (9) views are also randomly determined. For a different scene, such as scene N, it may be randomly determined that the different scene should have one (1) view for use as training data 310. The corresponding viewing direction of the one (1) view is also randomly determined. Any number of scenes and corresponding views can be used as training data 310 to train the untrained model 320.

In another aspect, during training of the model, a MSE loss function of photometric loss is utilized during training by computing the MSE between the actual and predicted pixel values. In some embodiments, a central loss function is utilized during training by computing the loss between the calibrated scene feature representation and each calibrated global feature representation computed for each input image of the scene. For example, to ensure frame-wise calibrated semantic features $$\{\tilde{S}_n\}_{n=1}^N$$

are consistent when projected onto the same target view, a central loss can be defined as:

$$\mathcal{L}_{central} = \frac{1}{N} \sum_{n=1}^N \|\tilde{S}_n - \tilde{S}\|_1. \tag{9}$$

In some embodiments, a point-wise perceptual loss is utilized during training. For example, during the rendering of a bath of pixels in a target view, the ground-truth image can be inpainted by replacing the corresponding pixels with the predicted ones. A perceptual loss can computed between the inpainted image and the target image to guide the training process at the whole-image level.

In some embodiments, the final loss function can be formulated based on a combination of MSE loss, central loss, and point-wise perceptual loss as follows:

$$\mathcal{L} = \mathcal{L}_{MSE} + \lambda_1 \mathcal{L}_{central} + \lambda_2 \mathcal{L}_{perc}. \tag{10}$$

In some embodiments, $\lambda_1 = 1$ and $\lambda_2 = 0.001$, can be set empirically.

Figure 3B:
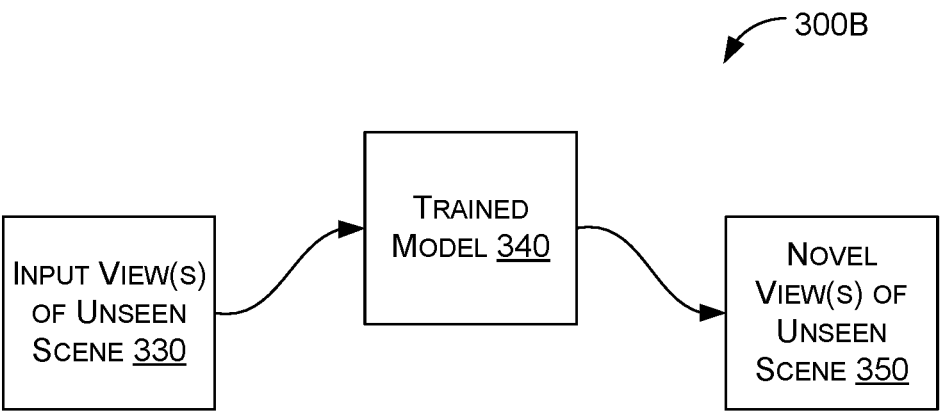
FIG. 3B is a block diagram of an example operating environment for using a novel view synthesis model, in accordance with an aspect of the technology described herein.

Turning now to FIG. 3B, the operation of a trained model 340 is illustrated in operating environment 300B, such as during operating of novel view synthesis model 240 of FIG. 2. The trained model 340 receives any number of input views of an unseen scene 330. In some embodiments, the number of input views is less than a threshold value as the model 240 is optimized for few-shot neural rendering. Trained model 340 renders a novel view of the unseen scene 350 from a different viewing direction than the input view(s) and/or any number of novel views of the unseen scene 350 from different viewing directions.

Example Methods

Now referring to FIGS. 4, 5 and 6, each block of methods 400, 500, and 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by an operating system. In addition, methods 400, 500, and 600 are described, by way of example, with respect to FIGS. 1-3B. However, these methods may additionally or alternatively be executed by any one system, or any combination of systems, including, but not limited to, those described herein.

FIG. 4 is a flow diagram showing a method 400 of using a view synthesis model to generate a novel view of a scene from a target viewing direction, in accordance with some embodiments of the present disclosure. Method 400 may be performed on or with systems similar to those described with reference to FIGS. 1-3B.

At step 410, the method 400 includes receiving, by a computing device, an input image, a viewing direction of the input image, and a target viewing direction, the input image representing a view of a scene from the viewing direction and the target viewing direction corresponding to a different view of the scene. The input image is scene that is different than each of a plurality of scenes used to train the model. In some embodiments, the input image is input along with a set of input images corresponding to different views from different corresponding viewing directions of the scene of the input image. Any amount of input images of a scene are within the scope of the embodiments described herein.

At step 420, the method 400 includes generating, based on applying the input image, a feature map corresponding to each pixel of the input image. In some embodiments, a feature map is generated each image of a plurality of input images. For example, each view is encoded by the CNN to be a feature map that extracts information, such as shading, material, semantics, and local/global complex light transport via a multi-scale architecture for each pixel of the input image.

At step 430, the method 400 includes generating, based on applying a plurality of projected pixel-point feature representations computed by projecting each feature map with respect to the viewing direction of its corresponding view to a view transformer, a plurality of aggregated projected pixel-point feature representations corresponding to features of a plurality of points in 3D space. In some embodiments, each of the projected pixel-point feature representations of each input image are computed based on a plurality of views with respect to the viewing direction and/or the target viewing direction. For example, projected pixel-point feature representations for each view within a threshold viewing direction, such as $\theta$ and/or $\Phi$ of viewing direction d, to a viewing direction can be generating, thereby generating projected pixel-point feature representations for each of the views within the threshold viewing direction. In some embodiments, each of the projected pixel-point feature representations are computed based on a plurality of views based on the viewing direction of each image in the set of images. For example, each position along a ray is projected by every input image (e.g., each source image) and each corresponding feature vector is interpolated on the image plane from a decoder. The view transformer's positional encoding is used to concatenate the extracted feature vector with the corresponding point coordinate (e.g., each position in 3D space), viewing direction, and/or relative directions of source views with respect to the target view. In some embodiments, the aggregated projected pixel-point feature representations and/or the projected pixel-point feature representations are only computed for pixels that lie on the corresponding epipolar lines of the neighboring views.

At step 440, the method 400 includes generating a scene feature representation based on the feature map. In some embodiments, the feature map extracted from each input image by a shared CNN encoder to generate the plurality of aggregated projected pixel-point feature representations is also used to generate the scene feature representation. In some embodiments, the scene feature representation is generated by applying a Global Average Pooling (GAP) to the output feature map of each input image to generate a global feature vector for each input image. The global feature vectors for each input image of the scene are averaged to generate the scene feature representation. In some embodiments, the global feature vectors for each input image are a single vector for each entire input image and/or the scene feature representation is a single vector for the entire scene.

At step 450, the method 400 includes generating, based on applying the plurality of aggregated projected pixel-point feature representations, the scene feature representation, and the target viewing direction to a ray transformer, a plurality of ray feature representations corresponding to each point sampled along each ray in the target viewing direction of the different view. In some embodiments, the aggregated projected pixel-point feature representations are concatenated with the scene feature representation to generate a global-local embedding that is applied to the ray transformer. The global-local embedding is subject to the self-attention mechanism of the ray transformer. In some embodiments, in order to maintain dimensional consistency, an MLP, such as a two-layer MLP, is utilized to project the global-local embedding back to the original dimension of the aggregated projected pixel-point feature representations.

At step 460, the method 400 includes rendering, based on predicting color values for each pixel from each of the plurality of ray feature representations, an output image representing the different view of the scene. In some embodiments, an MLP is utilized to map each of the plurality of ray feature representations to color values, such as the red-green-blue color model (RGB).

By integrating the scene-level semantic information of the scene feature representation with the per-point feature representations of the aggregated projected pixel-point feature representations, inherent interconnections within objects in the scene can be determined that would not otherwise be determined by the projected pixel-point feature representation alone.

FIG. 5 is a flow diagram showing a method 500 of calibrating and refining a scene feature representation utilized by a view synthesis model to generate a novel view of a scene from a target viewing direction, in accordance with some embodiments of the present disclosure. Method 500 may be performed on or with systems similar to those described with reference to FIGS. 1-3B.

At step 510, the method 500 includes generating a scene feature representation based on a feature map. The generating of a scene feature representation based on a feature map has been described previously.

At step 520, the method 500 includes generating, based on applying a rotation of the scene feature representation, a calibrated scene feature representation. In some embodiments, the rotation of the scene feature representation is computed by applying a rotational matrices that model the rotational variations of each input view and the target view. In some embodiments, a calibrated global feature representation is computed for each input image of the scene and the calibrated scene feature representation is computed by averaging each of the calibrated global feature representation of each of the input images of the scene. In some embodiments, flattening and inverse flattening operations are used to compute the calibrated scene feature representation based on the inverse of the extrinsic matrix of each input view, the extrinsic matrix of the target view, and/or the scene feature representation, and/or each corresponding global feature representation of each input view.

By calibrating the scene feature representation, pose-specific information can be isolated from the scene-level representation, thereby harmonizing features across input views, mitigating view-specific biases linked to specific camera poses that may introduce uncertainty in the rendering of the novel view of the scene, and/or reducing ambiguity.

At step 530, the method 500 includes refining the calibrated scene feature representation based on cross-attentions between the calibrated scene feature representation and the scene feature representation. In some embodiments, the refining of the calibrated scene feature representation is based on cross-attentions between the calibrated scene feature representation and each of the global feature vectors for each input image of the scene that are averaged to generate the scene feature representation. In some embodiments, the refining the calibrated scene feature representation is performed sequentially at a plurality of stages. Each stage includes a view transformer that sequentially refines a plurality of aggregated projected pixel-point feature representations corresponding to features of a plurality of points in 3D space; a ray transformer that sequentially refines a plurality of ray feature representations corresponding to each point sampled along each ray in the target viewing direction of the different view; and/or a calibrated scene feature representation refinement module that sequentially refines the calibrated scene feature representation. By sequentially refining the calibrated scene feature representation, varying levels of detail are introduced to enhance the semantic features for rendering the novel view of the scene.

At step 540, the method 500 includes generating, based on applying a plurality of aggregated projected pixel-point feature representations, the calibrated and/or refined scene feature representation, and the target viewing direction to a ray transformer, a plurality of ray feature representations corresponding to each point sampled along each ray in the target viewing direction of the different view. The generating of a plurality of ray feature representations by a ray transformer has been described previously.

At step 550, the method 500 includes rendering, based on predicting color values for each pixel from each of the plurality of ray feature representations, an output image representing the different view of the scene. The rendering of the output image has been described previously.

FIG. 6 is a flow diagram showing a method 600 of training a view synthesis model to generate a novel view of a scene from a target viewing direction, in accordance with some embodiments of the present disclosure. Method 600 may be performed on or with systems similar to those described with reference to FIGS. 1-3B.

At step 610, the method 600 includes receiving, by the computing device, training data comprising a plurality of scenes, each of the scenes comprising a plurality of input images corresponding to different views from different viewing directions of the scene.

At step 620, the method 600 includes training a neural network to render an output image representing a novel view of a previously unseen scene in a target viewing direction based on a corresponding input image of the scene in an input viewing direction. In some embodiments, a CNN is trained to output a feature map corresponding to each pixel of the input image. In some embodiments, a view transformer is trained to generate a plurality of aggregated projected pixel-point feature representations corresponding to features of a plurality of points in 3D space based on applying a plurality of projected pixel-point feature representations computed by projecting each feature map with respect to the viewing direction of its corresponding view. In some embodiments, a ray transformer is trained to generate a plurality of ray feature representations corresponding to each point sampled along each ray in the target viewing direction of the different view based on applying the plurality of aggregated projected pixel-point feature representations, the scene feature representation (for example, the scene feature representation, the calibrated scene feature representation, and/or the refined calibrated scene feature representation), and the target viewing direction. In some embodiments, an MLP is trained to predict color values for each pixel from each of the plurality of ray feature representations in order to render the output image. In some embodiments, a calibrated scene feature representation refinement module is trained to sequentially refine the calibrated scene feature representation.

In some embodiments, the neural network includes a plurality of stages that are trained to sequentially refine the output from the neural network. For example, each stage includes a view transformer that is trained to sequentially refine a plurality of aggregated projected pixel-point feature representations corresponding to features of a plurality of points in 3D space; a ray transformer that is trained to sequentially refine a plurality of ray feature representations corresponding to each point sampled along each ray in the target viewing direction of the different view; and/or a calibrated scene feature representation refinement module that is trained to sequentially refine the calibrated scene feature representation.

In some embodiments, a Mean Square Error (MSE) loss function is utilized during training by computing the MSE between the actual and predicted pixel values. In some embodiments, a central loss function is utilized during training by computing the loss between the calibrated scene feature representation and each calibrated global feature representation computed for each input image of the scene. In some embodiments, a point-wise perceptual loss is utilized during training by computing a perceptual loss between an inpainted image and the ground truth target image to guide the training process at the whole image level.

At step 630, the method 600 includes outputting the trained neural network. Once trained, the neural network is able to generate novel views of previously unseen scenes based on few-shot of view(s) of the unseen scene and a desired viewing direction of the unseen scene.

Example Operating Environment

Figure 7:
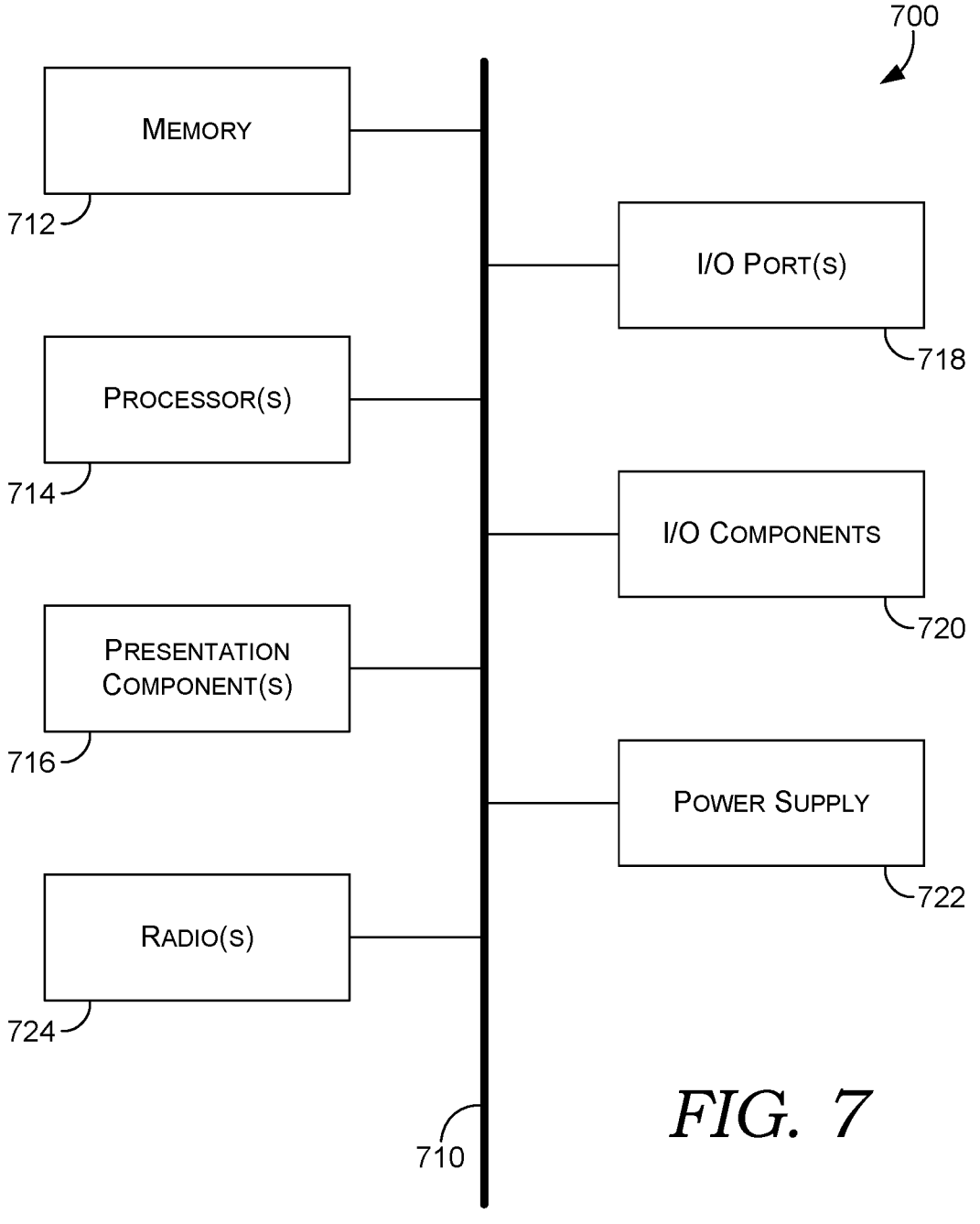
FIG. 7 is a block diagram showing a computing device suitable for implementations of the technology described herein.

Referring to the drawings in general, and initially to FIG. 7 in particular, an example operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of a computing device that may be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media may be any available media that may be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Example memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Example presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include a radio 724. The radio 724 transmits and receives radio communications. The computing device may be a wireless terminal adapted to receive communications and media over various wireless networks. Computing device 700 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

As used herein, the term "set" may be employed to refer to an ordered (i.e., sequential) or an unordered (i.e., non-sequential) collection of objects (or elements), such as but not limited to data elements (e.g., events, cells, rows, and the like). A set may include N elements, where N is any non-negative integer that is 1 or greater. That is, a set may include 1, 2, 3 . . . . N objects and/or elements, where N is a positive integer with no upper bound. A set may include only a single element. In other embodiments, a set may include a number of elements that is significantly greater than one, two, or three elements. For example, various embodiments and examples described herein refer to a "set" of features or a "set" of feature vectors. This refers to one or more features and one or more feature vectors respectively. Embodiments The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by computing device performs a method of training a diffusion model, the method comprising:

receiving, by a computing device, an input image, a viewing direction of the input image, and a target viewing direction, the input image representing a view of a scene from the viewing direction and the target viewing direction corresponding to a different view of the scene;

generating, based on applying the input image to a first neural network, a feature map corresponding to pixels of the input image;

generating, using the feature map as input to a global average pooling process, a scene feature representation;

generating a projected pixel-point feature representation by applying the feature map to a second neural network;

generating, by a ray transformer taking the pixel feature representation, the scene feature representation and the target viewing direction as input, a plurality of ray feature representations corresponding to each point sampled along each ray in the target viewing direction of the different view;

generating, from the plurality of ray feature representations, color values for each pixel of an output image representing the different view of the scene; and causing rendering of the output image using the color values as input to a rendering process.

2. The media of claim 1, wherein the scene feature representation is a single vector representation of the scene.

3. The media of claim 1, wherein the scene feature representation is generated by:

applying, based on the viewing direction of the input image and the target viewing direction, a rotation to an uncalibrated scene feature representation to calibrate the scene feature representation.

4. The media of claim 1, wherein the scene feature representation is generated by:

applying a rotation to an uncalibrated scene feature representation to calibrate the scene feature representation; and refining, based on cross-attentions between the uncalibrated scene feature representation before applying the rotation and the scene feature representation after applying the rotation, the scene feature representation.

5. The media of claim 1, wherein the method further comprises:

sequentially refining the color values for each pixel of the output image at a plurality of stages by:

refining the plurality of pixel feature representations by a view transformer at each stage;

refining the scene feature representation by a scene feature representation refinement module at each stage; and refining a plurality of feature representations corresponding to the color values for each pixel of the output image by the ray transformer at each stage.

6. The media of claim 1, wherein the first neural network is a convolutional neural network (CNN) encoder.

7. The media of claim 1, wherein the plurality of pixel feature representations are generated by:

computing a plurality of projected pixel-point feature representations by projecting the feature map with respect to the viewing direction of the input image; and generating, based on applying the plurality of projected pixel-point feature representations to a view transformer, a plurality of aggregated projected pixel-point feature representations as the plurality of pixel feature representations.

8. The media of claim 1, wherein the color values for each pixel of the output image are generated by:

generating, based on applying the plurality of ray feature representations to a multilayer perception (MLP), the color values for each pixel of the output image.

9. One or more computer storage media comprising computer-executable instructions that when executed by computing device performs a method of training a diffusion model, the method comprising:

receiving, by a computing device, a set of input images, each viewing direction of each of the set of input images, and a target viewing direction, the set of input images representing corresponding views of a scene from each viewing direction and the target viewing direction corresponding to a different view of the scene;

generating, based on applying each of the set of input images to a first neural network, a plurality of feature maps corresponding to each of the set of input images, each feature map of the set of feature maps corresponding to pixels of each corresponding input image of the set of input images;

generating, by using each of the set of feature maps as input to a global average pooling process, a scene feature representation;

generating a plurality of projected pixel-point feature representations by applying the set of feature maps to a second neural network;

generating, by a ray transformer taking the plurality of pixel feature representations the scene feature representation and the target viewing direction as input to the ray transformer, a plurality of ray feature representations corresponding to each point sampled along each ray in the target viewing direction of the different view;

generating, from the plurality of ray feature representations, color values for each pixel of an output image representing the different view of the scene; and causing rendering of the output image using the color values as input to a rendering process.

10. The media of claim 9, wherein the scene feature representation is generated by:

applying a Global Average Pooling (GAP) to each of the set of feature maps to generate a plurality of global feature vectors; and averaging the set of global feature vectors to generate the scene feature representation corresponding to a single vector representation of the scene.

11. The media of claim 9, wherein the scene feature representation is generated by:

generating, based on each of the set of feature maps, a plurality of global feature vectors;

applying, based on each corresponding viewing direction of each of the set of input images and the target viewing direction, a rotation to each of the set of global feature vectors to calibrate each of the set of global feature vectors; and averaging the set of global feature vectors after calibrating each of the set of global feature vectors to generate the scene feature representation.

12. The media of claim 9, wherein the scene feature representation is generated by:

generating, based on each of the set of feature maps, a plurality of global feature vectors;

applying a rotation to each of the set of global feature vectors to calibrate each of the set of global feature vectors;

averaging the set of global feature vectors after calibrating each of the set of global feature vectors to generate the scene feature representation; and refining, based on cross-attentions between each of the set of global feature vectors before applying the rotation and the scene feature representation, the scene feature representation.

13. The media of claim 9, wherein the method further comprises:

sequentially refining the color values for each pixel of the output image at a plurality of stages by:

refining, by a view transformer, the plurality of pixel feature representations at each stage;

refining, by a scene feature representation refinement module, the scene feature representation at each stage; and refining, by the ray transformer, a plurality of feature representations corresponding to the color values for each pixel of the output image at each stage.

14. The media of claim 9, wherein each of the set of feature maps is generated based on applying each corresponding input image from the set of input images to a convolutional neural network (CNN) of the neural network.

15. The media of claim 9, wherein the plurality of pixel feature representations are generated by:

computing a plurality of projected pixel-point feature representations by projecting each of the set of feature maps with respect to each corresponding viewing direction of each of the set of input images; and generating, based on applying each of set of plurality of projected pixel-point feature representations to a view transformer, a plurality of aggregated projected pixel-point feature representations as the plurality of pixel feature representations.

16. The media of claim 9, wherein the color values for each pixel of the output image are generated by:

generating, based on applying the plurality of ray feature representations to a multilayer perception (MLP), the color values for each pixel of the output image.

17. A method of novel view synthesis, comprising:

receiving, by a computing device, an input image, a viewing direction of the input image, and a target viewing direction, the input image representing a view of a scene from the viewing direction and the target viewing direction corresponding to a different view of the scene;

generating, based on applying the input image to a first neural network, a feature map corresponding to pixels of the input image;

generating, based on applying the feature map and viewing direction of the input image to a second neural network, a plurality of pixel feature representations corresponding to the pixels of the input image;

generating, by using the feature map as input to a global average pooling process, an uncalibrated scene feature representation;

generating, based on applying a rotation to the uncalibrated scene feature representation based on the viewing direction of the input image and the target viewing direction, a scene feature representation;

generating, by a ray transformer taking the plurality of pixel feature representations, the scene feature representation and the target viewing direction as input, a plurality of ray feature representations corresponding to each point sampled along each ray in the target viewing direction of the different view;

generating, from the plurality of ray feature representations, color values for each pixel of an output image representing the different view of the scene; and causing rendering of the output image using the color values as input to a rendering process.

18. The method of claim 17, wherein the scene feature representation is generated by applying a Global Average Pooling (GAP) to the feature map to generate a single vector representation of the scene.

19. The method of claim 17, wherein the scene feature representation is generated by:

refining, based on cross-attentions between the uncalibrated scene feature representation before applying the rotation and the scene feature representation after applying the rotation, the scene feature representation.

20. The method of claim 17, further comprising:

sequentially refining the color values for each pixel of the output image at a plurality of stages by:

refining the plurality of pixel feature representations by a corresponding view transformer at each stage;

refining the scene feature representation by a scene feature representation refinement module at each stage; and refining a plurality of feature representations corresponding to the color values for each pixel of the output image by the ray transformer at each stage.

* * * * *